United States Patent
Lee et al.

(10) Patent No.: US 9,991,546 B2
(45) Date of Patent: Jun. 5, 2018

(54) FUEL CELL STACK ASSEMBLY DEVICE AND CONTROL METHOD

(71) Applicants: Hyundai Motor Company, Seoul (KR); Kia Motors Corporation, Seoul (KR)

(72) Inventors: Nam Gu Lee, Gyeonggi-do (KR); Kyung Sik Son, Seoul (KR); Sang Hyun Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 121 days.

(21) Appl. No.: 15/143,855

(22) Filed: May 2, 2016

(65) Prior Publication Data

US 2017/0092977 A1    Mar. 30, 2017

(30) Foreign Application Priority Data

Sep. 25, 2015 (KR) .................. 10-2015-0137067

(51) Int. Cl.
*H01M 8/24* (2016.01)
*H01M 8/248* (2016.01)
*H01M 8/2404* (2016.01)
*H01M 8/1018* (2016.01)

(52) U.S. Cl.
CPC ......... *H01M 8/248* (2013.01); *H01M 8/2404* (2016.02); *H01M 2008/1095* (2013.01); *H01M 2250/20* (2013.01); *Y02T 90/32* (2013.01)

(58) Field of Classification Search
CPC ...... H01M 8/248; H01M 8/2404; H01M 8/24; H01M 8/2465; H01M 2008/1095; H01M 2250/20; Y02T 90/32
See application file for complete search history.

(56) References Cited

U.S. PATENT DOCUMENTS

| 2006/0006155 A1* | 1/2006 | Hill ................. H01M 8/248 219/121.63 |
| 2012/0005885 A1* | 1/2012 | Kwok .............. H01M 8/247 29/760 |

FOREIGN PATENT DOCUMENTS

| JP | 2004-335146 A | 11/2004 |
| JP | 2005-071627 A | 3/2005 |
| JP | 2009-021080 A | 1/2009 |
| JP | 2009059535 A * | 3/2009 |
| JP | 2010-113997 A | 5/2010 |
| JP | 2010-212139 A | 9/2010 |
| KR | 10-0762254 B1 | 10/2007 |
| KR | 2009-0062955 A | 6/2009 |

(Continued)

*Primary Examiner* — Gregg Cantelmo
(74) *Attorney, Agent, or Firm* — Mintz Levin Cohn Ferris Glovsky and Popeo, P.C.; Peter F. Corless

(57) ABSTRACT

A fuel cell stack assembly device is provided. The assembly device includes a stack guide apparatus that arranges and stacks fuel cells using a plurality of guide bars and a press unit that repeatedly moves vertically based on the stack guide apparatus and presses the fuel cells stacked on the stack guide apparatus. A roller structure includes a roller in rolling contact with the guide bar and is installed at the press unit. A weight detection portion detects weight that is applied to the roller by the guide bar. Additionally, a controller determines whether the guide bar is at the home position based on a detection signal of the weight detection portion and operates the press unit.

16 Claims, 7 Drawing Sheets

(56) References Cited

FOREIGN PATENT DOCUMENTS

| | | | | |
|---|---|---|---|---|
| KR | 20110017294 A | * | 2/2011 | |
| KR | 10-1140447 B1 | | 4/2012 | |
| KR | 10-2015-0059542 A | | 6/2015 | |
| WO | WO-0209216 A2 | * | 1/2002 | ............ H01M 8/247 |
| WO | WO-2014171260 A1 | * | 10/2014 | ............ H01M 8/248 |

* cited by examiner

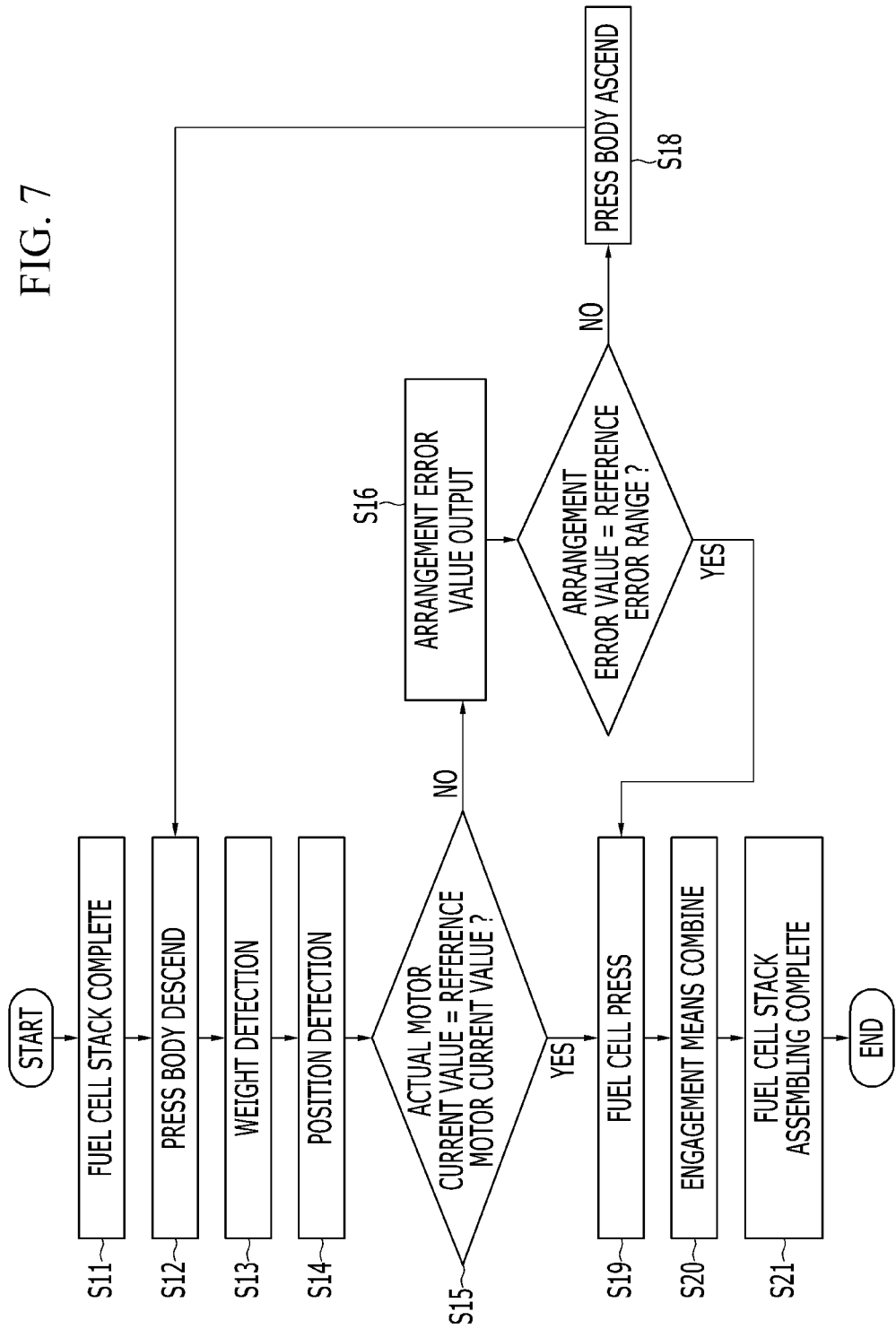

FUEL CELL STACK ASSEMBLY DEVICE AND CONTROL METHOD

CROSS-REFERENCE TO RELATED APPLICATION

This application claims priority to and the benefit of Korean Patent Application No. 10-2015-0137067 filed in the Korean Intellectual Property Office on Sep. 25, 2015, the entire contents of which are incorporated herein by reference.

BACKGROUND (a) Field of the Invention

The present invention relates to a fuel cell stack assembly device and control method, and more particularly, to a fuel cell stack assembly device and control method for pressing stacked fuel cell components and assembling the stack as a fuel cell assembly.

(b) Description of the Related Art

As is known in the art, a fuel cell stack is a type of generator configured to generate electrical energy by electrochemical reaction of hydrogen and oxygen of fuel cells, and for example, the fuel cell is applied to a fuel cell vehicle. The fuel cell stack is a fuel cell assembly having several hundred unit fuel cells arranged continuously. The fuel cell is a unit cell in which separating plates are disposed at both sides of a membrane-electrode assembly (MEA) interposing the same. The fuel cells may be combined by an end plate and an engagement device in a pressed state.

The fuel cell stack may be assembled by a process such as stacking and arranging fuel cells using a stack guide apparatus (conventionally called a "cartridge" in the industry), pressing the stacked fuel cells between end plates of top and down bottom, and combining the end plates using an engagement device. In the related art, the stack guide apparatus arranges and stacks the fuel cells without generating arrangement errors of the fuel cells and includes a guide bar configured to guide and arrange the fuel cells. For example, the stack guide apparatus includes a guide bar of which an upper end is formed as a free end and a lower end is formed as a structure combined to a bottom side.

However, when the fuel cells are stacked and arranged using the stack guide apparatus, the fuel cells may not be stacked at an exact position and may be stacked with a deviation exceeding a predetermined arrangement error range. In particular, when the fuel cells are pressed with such a deviation present, the guide bar of the stack guide apparatus may be distorted due to the arrangement error of the fuel cells. In other words, a lower end of the guide bar is combined to the bottom of the stack guide apparatus and an upper end of the guide bar is not supported, therefore when the fuel cells are pressed, a buckling phenomenon may occur due to the arrangement error of the fuel cells and the guide bar may be distorted in the outer direction.

Accordingly, in the related art, the guide bar of the stack guide apparatus does not properly perform arrangement of the fuel cells, therefore poor assembly may occur by the stack fault of the fuel cells, and faulty assembling of the fuel cell stack may be increased by the arrangement error of the fuel cells.

The above information disclosed in this section is merely for enhancement of understanding of the background of the invention and therefore it may contain information that does not form the prior art that is already known in this country to a person of ordinary skill in the art.

SUMMARY

The present invention provides a fuel cell stack assembly device and control method that determine whether a guide bar is at a home position (e.g., an original position) and that minimize arrangement errors of the fuel cells using a simplified structure.

A fuel cell stack assembly device according to an exemplary embodiment of the present invention may include a stack guide apparatus configured to arrange and stack fuel cells using a plurality of guide bars, a press unit configured to repeatedly move in upper and lower directions according to the stack guide apparatus (e.g., move vertically based on the movement of the stack guide apparatus) and press the fuel cells stacked on the stack guide apparatus, a roller structure including a roller having rolling contact with the guide bar and being installed at the press unit, a weight detection portion configured to detect weight applied to the roller by the guide bar, and a controller configured to determine whether the guide bar is at a home position based on a detection signal of the weight detection portion and operate the press unit.

In the fuel cell stack assembly device according to an exemplary embodiment of the present invention, the press unit may include a press frame, a press cylinder installed on the press frame, and a press body connected to the press cylinder. In addition, the guide bar may be configured to arrange the fuel cells at an inside surface of the guide bar and the roller may have rolling contact with an exterior surface of the guide bar.

Furthermore, the roller structure may include a rotation plate installed at a supporting bar connected to the press unit and rotatable by a motor. The roller of the roller structure may be rotatable and installed at a center of the rotation plate. Additionally, the motor may be combined to the rotation plate by a drive shaft. The weight detection portion may further be configured to measure a current value of the motor and detect an abnormal current value of the motor that varies by the weight applied to the roller.

A fuel cell stack assembly device according to an exemplary embodiment of the present invention may include a stack guide apparatus configured to arrange and stack fuel cells using a plurality of guide bars, a press unit configured to repeatedly move in upper and lower directions (e.g., vertical directions) based on the stack guide apparatus and press the fuel cells stacked on the stack guide apparatus, a roller structure including a roller having rolling contact with the guide bar and being installed at the press unit, a weight detection portion configured to detect weight applied to the roller by the guide bar, a position detection portion (e.g., a sensor) installed at the press unit and configured to detect a position of the guide bar, and a controller configured to output an arrangement error value of the fuel cells based on a detection signal of the weight detection portion and the position detection portion, determine whether the guide bar is at the home position by comparing the arrangement error value with a reference error range, and operate the press unit.

In the fuel cell stack assembly device according to an exemplary embodiment of the present invention, the roller structure may include a rotation plate installed at a supporting bar connected to the press unit and rotatable by a motor. In addition, the roller may be rotatable and installed at a center of the rotation plate. The weight detection portion may further be configured to measure a current value of the motor and detect an abnormal current value of the motor that varies by the weight applied to the roller. The position detection portion may include a displacement sensor.

A control method of the fuel cell stack assembly device according to an exemplary embodiment of the present invention may include applying a descent operation signal to the press unit, rotating the roller structure by applying a control signal to the motor, measuring a current value of the motor by the weight detection portion, and detecting an abnormal current value of the motor that varies by the weight applied to the roller of the roller structure, determining whether the guide bar is at the home position by comparing an actual motor current value detected by the weight detection portion with a reference motor current value having a predetermined range, and applying an ascent operation signal to the press unit in response to determining that the guide bar is not at the home position.

In a control method of the fuel cell stack assembly device according to an exemplary embodiment of the present invention, when the actual motor current value is within the reference motor current value, the guide bar may be determined to be at the home position. In addition, when the actual motor current value exceeds the reference motor current value, the guide bar may be determined to not be at the home position. In response to determining that the guide bar is at the home position, a descent operation signal may be continuously applied to the press unit.

Furthermore, a control method of the fuel cell stack assembly device according to an exemplary embodiment of the present invention may include applying a descent operation signal to the press unit, rotating the roller structure by applying a control signal to the motor, measuring a current value of the motor by the weight detection portion, and detecting abnormal current value of the motor that varies by the weight applied to the roller, detecting a position of the guide bar by the position detection portion, comparing an actual motor current value detected by the weight detection portion with a reference motor current value having a predetermined range to output an arrangement error value of the fuel cells by a position value of the guide bar detected by the position detection portion when the actual motor current value exceeds the reference motor current value, comparing the arrangement error value and the predetermined reference error range to determine whether the guide bar is at the home position, and applying an ascent operation signal to the press unit in response to determining that the guide bar is not at the home position.

In a control method of the fuel cell stack assembly device according to an exemplary embodiment of the present invention, the arrangement error value (mm) may be output by a formula of {sin(position value of the guide bar)°×length (mm) of the guide bar}. In addition, when the arrangement error value is within the reference error range, the guide bar may be determined to be at the home position. When the arrangement error value exceeds the reference error range, the guide bar may be determined to not be at the home position. In response to determining that the guide bar is at the home position, a descent operation signal may be continuously applied to the press unit.

According to the exemplary embodiments of the present invention, whether the guide bar is at the home position may be determined, an arrangement error of the fuel cells may be minimized using a simplified structure, an assembling fault occurring by inaccurate stacking of the fuel cells may be prevented, and an assembling fault of the fuel cell stack occurring by a stack arrangement error may be prevented.

BRIEF DESCRIPTION OF THE DRAWINGS

Since these drawings are for reference to explain an exemplary embodiment of the present invention, the spirit of the present invention should not be defined by the accompanying drawings.

FIG. 7 is a flowchart illustrating a control method of the fuel cell stack assembly device according to another exemplary embodiment of the present invention.

DESCRIPTION OF SYMBOLS

Figure 1:
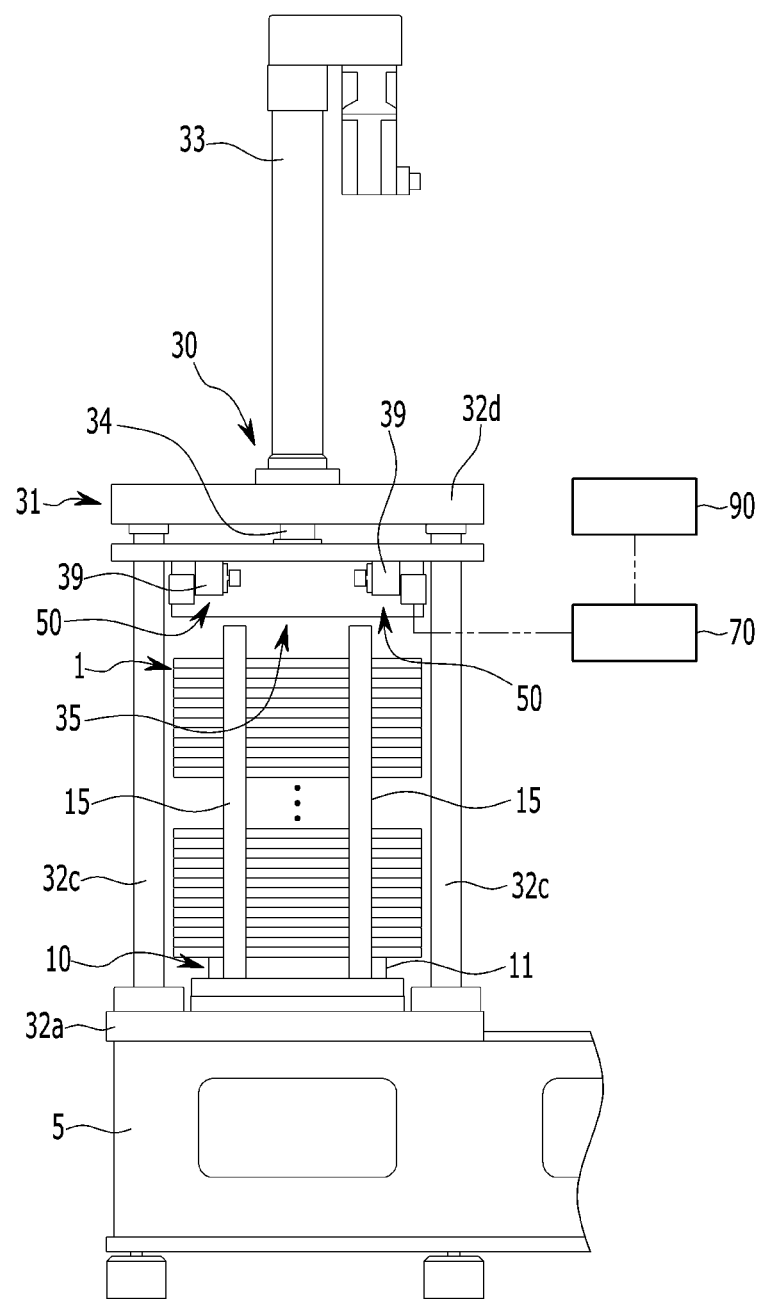
FIG. 1 is a schematic front view diagram of a fuel cell stack assembly device according to an exemplary embodiment of the present invention.

1 . . . fuel cell
5 . . . base frame
10 . . . stack guide apparatus
11 . . . bottom plate
15 . . . guide bar
30 . . . press unit
31 . . . press frame
32$a$ . . . lower plate
32$c$ . . . guide rod
32$d$ . . . upper plate
33 . . . press cylinder
34 . . . operation rod
35 . . . press body
39 . . . supporting bar
50 . . . roller structure
51 . . . rotation plate
53 . . . roller
55 . . . motor
57 . . . drive shaft
70 . . . weight detection portion
80 . . . position detection portion
90 . . . controller

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described more fully with reference to the accompanying drawings, in which exemplary embodiments of the invention are shown. As those skilled in the art would realize, the described exemplary embodiments may be modified in various different ways, all without departing from the spirit or scope of the present invention.

In the drawings, to clearly describe the present invention, parts not related to the description are omitted, and the same reference numerals are designated for identical or similar elements throughout specification. The size and thickness of each element shown in the drawings are arbitrarily shown for convenience of description, but the scope of the present is not necessarily limited to the drawings, and the thickness is magnified to clearly express several parts and regions. In the detailed description, elements are distinguished by first, second, etc. to distinguish the elements, but they are not necessarily limited to the order in the description. When a part "includes" a certain element, this means that the part may not exclude other elements but may further include them throughout the specification, unless a specific opposite description is presented. In addition, terms such as "unit", "means", "part", "member", etc. described in the specification mean a unit that processes at least one function or operation.

FIG. 1 is a schematic front view diagram of a fuel cell stack assembly device according to an exemplary embodiment of the present invention. Referring to FIG. 1, a fuel cell stack assembly device 100 is for assembling a fuel cell stack by a process of pressing a plurality of sequentially stacked fuel cells 1 and combining them. Particularly, the fuel cell 1 may include a separating plate component in which, for example, a cathode metal separating plate and an anode metal separating plate are connected to each other, and a membrane-electrode assembly (MEA) sheet component in which gas diffusion layer (GDL) is connected at both sides of an MEA.

In the fuel cell stack assembly device 100 according to an exemplary embodiment of the present invention, when the fuel cells are sequentially arranged and stacked, the fuel cells 1 may be pressed by a press and combined by an engagement device, and the fuel cell stack may be assembled. The fuel cell stack assembly device 100 according to an exemplary embodiment of the present invention may minimize stack arrangement errors of the fuel cells 1 by using a simplified structure. Additionally, the fuel cell stack assembly device 100 may include a stack guide apparatus 10, a press unit 30, a roller structure 50, a weight detection portion 70, and a controller 90.

Various constituent elements of the fuel stack assembly device 100 which will be described hereinafter may be installed at a base frame 5, and the base frame 5 may be configured to support each constituent element and may consist of one frame or a divided frame of two or more parts. The base frame 5 may include various sub-elements such as a bracket configured to support various constituent elements, a bar, a rod, a plate, a housing, a case, and a block. However, since the various sub-elements may be used to install constituent elements of the fuel cell stack assembly device 100 which will be described hereinafter in the base frame 5, the sub-elements may be commonly called a base frame 5 except for an extraordinary case in the exemplary embodiment of the present invention.

In an exemplary embodiment of the present invention, the stack guide apparatus 10 may be configured to arrange and stack the fuel cells 1 in the upper and lower direction, and may be movably mounted on the base frame 5 based on a set transfer route. Particularly, the stack guide apparatus 10 may include a bottom plate 11 and a plurality of guide bars 15 respectively combined at front and rear edges as a pair and disposed in the upper direction.

The bottom plate 11 may be movably mounted based on a set guide rail, and the guide bar 15 may have a square cross-sectional shape. The upper end of the guide bar may be is formed as a free end, and the lower end of the guide bar 15 may be combined with (e.g., connected to) the front and rear edges of the bottom plate 11. The guide bar 15 may be configured to support edges of the stacked fuel cells 1 through the inside surface and may be configured to arrange the fuel cells 1. The opposite surface of the inside surface of the guide bar 15 will be referred to as an outside surface hereinafter.

In an exemplary embodiment of the present invention, the press unit 30 may be stacked in the upper direction from the upper surface of the bottom plate 11 of the stack guide apparatus 10, and may be configured to press against the fuel cells 1 arranged by the guide bar 15. This press unit 30 may include a press frame 31, a press cylinder 33, and a press body 35. The press frame may be is installed on the base frame 5. Additionally, the press frame 31 may include a lower plate 32a fixed on the base frame 5 and formed with a square shape, a guide rod 32c installed vertically at the respective edges of the lower plate 32a in upper and lower directions, and an upper plate 32d fixed on the upper end portion of the guide rod 32c and formed with a square shape. The stack guide apparatus 10 may be transferred along the guide rail and may be disposed on the lower plate 32a of the press frame 31.

The guide rod 32c may be configured to support the press body 35 and guide the press body 35 in the upper and lower directions (e.g., in vertical directions). The lower end portion of the guide rod 32c may be connected to the respective edges of the lower plate 32a, and the upper end portion of the guide rod 32c may be connected to the respective edges of the upper plate 32d. The press cylinder 33 may be installed on the upper plate 32d of the press frame 31, and may include an operation rod 34 that penetrates the upper plate 32d and operates forward and backward (e.g., horizontally) in the upper and lower directions (e.g., vertical directions). The press cylinder 33 may be an air pressure cylinder or a hydraulic pressure cylinder.

Further, the press body 35 may be configured to apply pressure or force to the fuel cells 1 stacked on the stack guide apparatus 10 disposed on the lower plate 32a of the press frame 31, and may be repeatedly movable in vertical directions by the press cylinder 33. The press body 35 may be installed and connected to the front end of the operation rod 34 of the press cylinder 33. Additionally, the press body 35 may be engaged at the guide rod 32c of the press frame 31, and may be configured to repeatedly move in the vertical directions along the guide rod 32c by forward and backward operation of the operation rod 34 of the press cylinder 33. In an exemplary embodiment of the present invention, the roller structure 50 may be configured to support the guide bar 15 of the stack guide apparatus 10 when the press body 35 descends to press the fuel cells 1 stacked on the stack guide apparatus 10.

Figure 2:
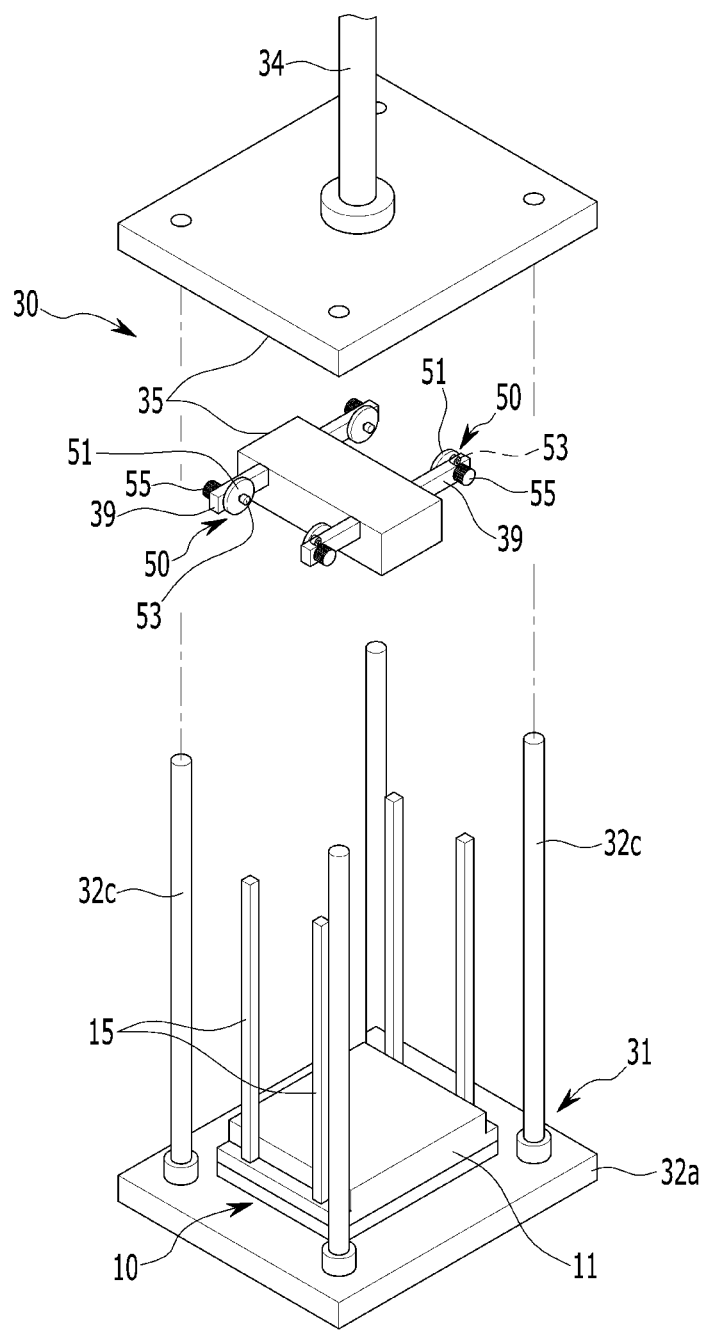
FIG. 2 is a partial detailed view of a fuel cell stack assembly device according to an exemplary embodiment of the present invention.
Figure 3:
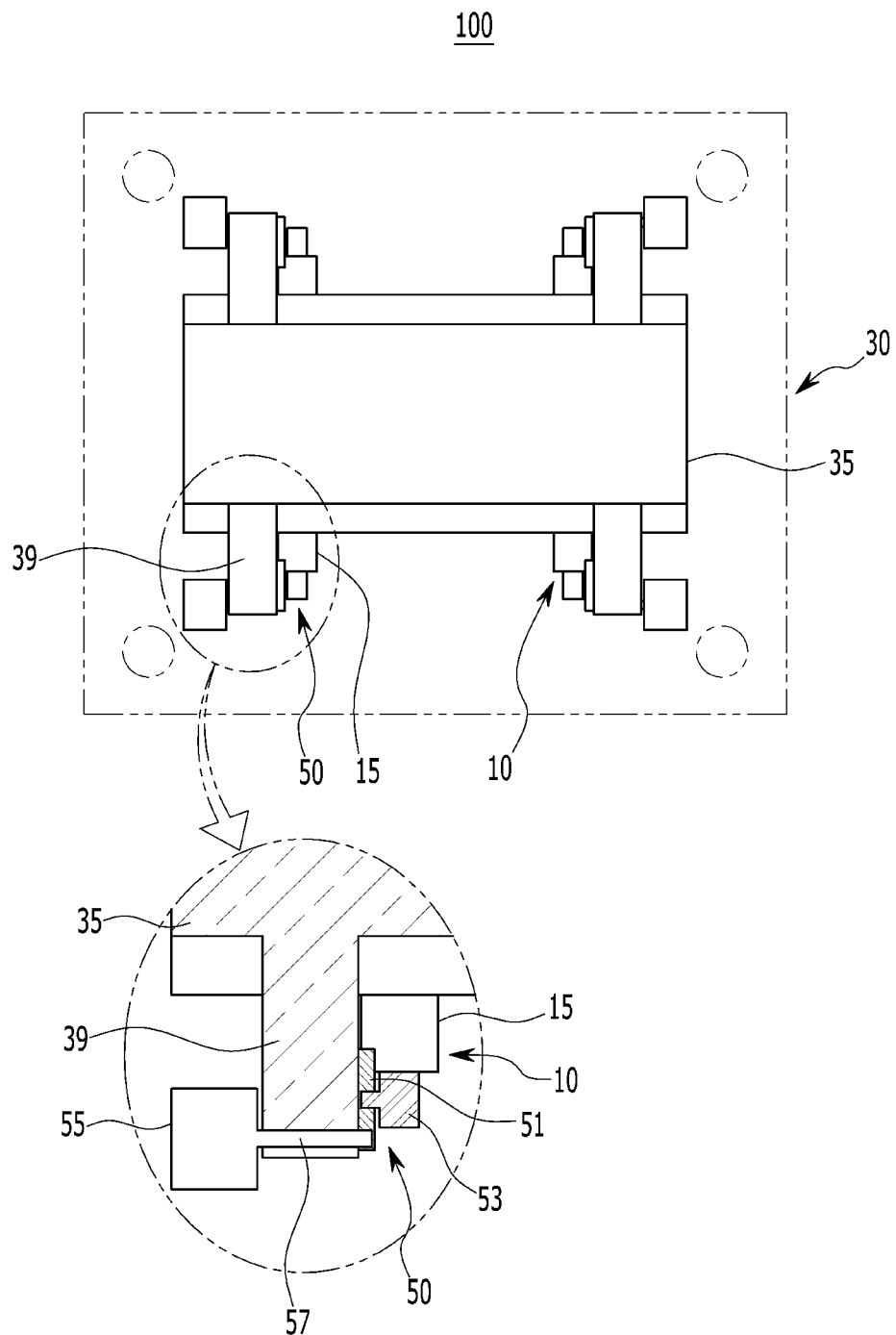
FIG. 3 is a plan schematic diagram of a fuel cell stack assembly device according to an exemplary embodiment of the present invention.
Figure 4:
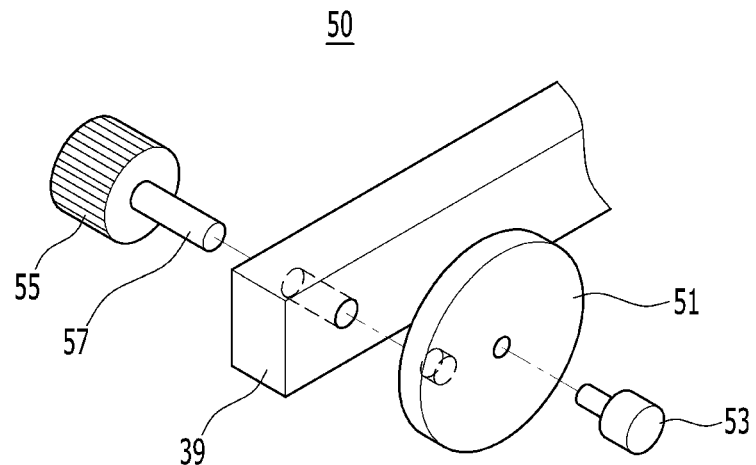
FIGS. 4A-4B are drawings illustrating a roller structure applied to a fuel cell stack assembly device according to an exemplary embodiment of the present invention.
Figure 4:
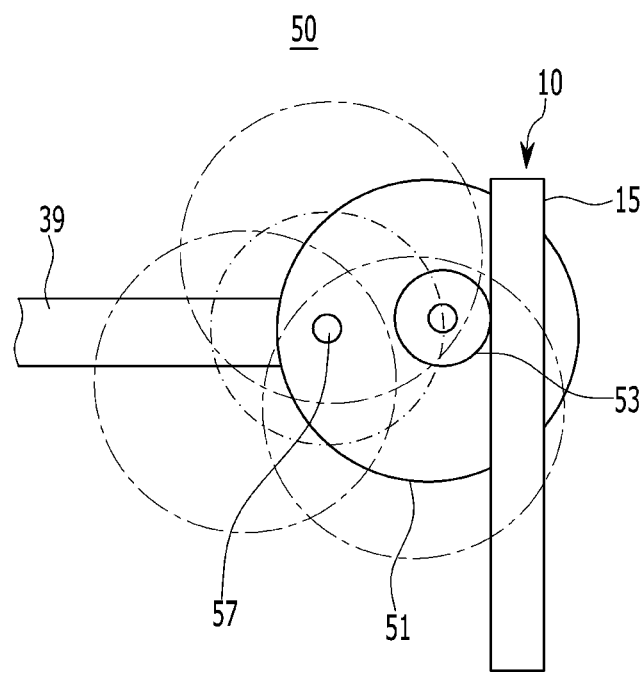

FIG. 2 is a partial detailed view of a fuel cell stack assembly device according to an exemplary embodiment of the present invention, FIG. 3 is a plan schematic diagram of a fuel cell stack assembly device according to an exemplary embodiment of the present invention, and FIGS. 4A-4B are drawings illustrating a roller structure applied to a fuel cell stack assembly device according to an exemplary embodiment of the present invention. Referring to FIG. 1 to FIG. 4B, the roller structure 50 according to an exemplary embodiment of the present invention may be installed and connected to the press body 35. The roller structure 50 may include a rotation plate 51 and a roller 53.

Furthermore, the rotation plate 51 may be installed at a supporting bar 39 connected to the press body 35 and may be rotatable. The rotation plate 51 rotates by a motor 55 fixed on the supporting bar 39. The motor 55 may be connected to the position above a center of the rotation plate 51 by a drive shaft 57. The roller 53 may be installed at the center of the rotation plate 51 and may be rotatable. In particular, the roller 53 may be installed to be rotatably idle in a no-load condition at the center of the rotation plate 51. Additionally, the roller 53 may be in rolling contact with the guide bar 15 of the stack guide apparatus 10 (e.g., the roller may move along the guide bar while in contact therewith). In other words, the roller 53 may be configured to rotate while contacting the exterior surface of the guide bar 15.

The rotation plate 51 of the roller structure 50 may be installed to be rotatable by the motor 55 to not have the roller 53 interfere with the guide bar 15 when the press body 35 descends. Further, the rotation plate 51 may be configured to rotate by a predetermined rotation angle of the motor 55 to allow the roller 53 to enter the home position (e.g., an original position) at a predetermined reference position of the guide bar 15. In particular, the reference position of the guide bar 15 indicates a position at which the guide bar 15 is not split in the outside direction but maintains a vertical state with respect to the bottom plate 11 of the stack guide apparatus 10.

As shown in FIG. 1, the weight detection portion 70 according to an exemplary embodiment of the present invention may be configured to detect a weight applied to the roller 53 which is rotating and in contact the guide bar 15 when the press body 35 descends, to press the fuel cells 1 and cause the rotation plate 51 of the roller structure 50 to rotate by the motor 55. In other words, the weight detection portion 70 may be configured to detect a weight applied to the roller 53 through the guide bar 15 when the fuel cells 1 are pressed by the press body 35 and the guide bar 15 is split toward the exterior by a stack error of the fuel cells 1. For example, the weight detection portion 70 may be configured to measure a current value of the motor 55 and detect an abnormal motor current value that differs by a weight applied to the roller 53 through the guide bar 15.

Meanwhile, in an exemplary embodiment of the present invention, the controller 90 may be configured to operate the fuel cell stack assembly 100, receive a detection signal from the weight detection portion 70 to determine whether the guide bar 15 is on or at the home position based on the detection signal, operate the press body 35. Control logic of the controller 90 will now be more specifically described through a description of the control method of the fuel cell stack assembly device according to an exemplary embodiment of the present invention.

Hereinafter, the control method of the fuel cell stack assembly device 100 according to an exemplary embodiment of the present invention and the entire assembling process using the method will be described specifically with reference to previously disclosed drawings and additional drawings.

Figure 5:
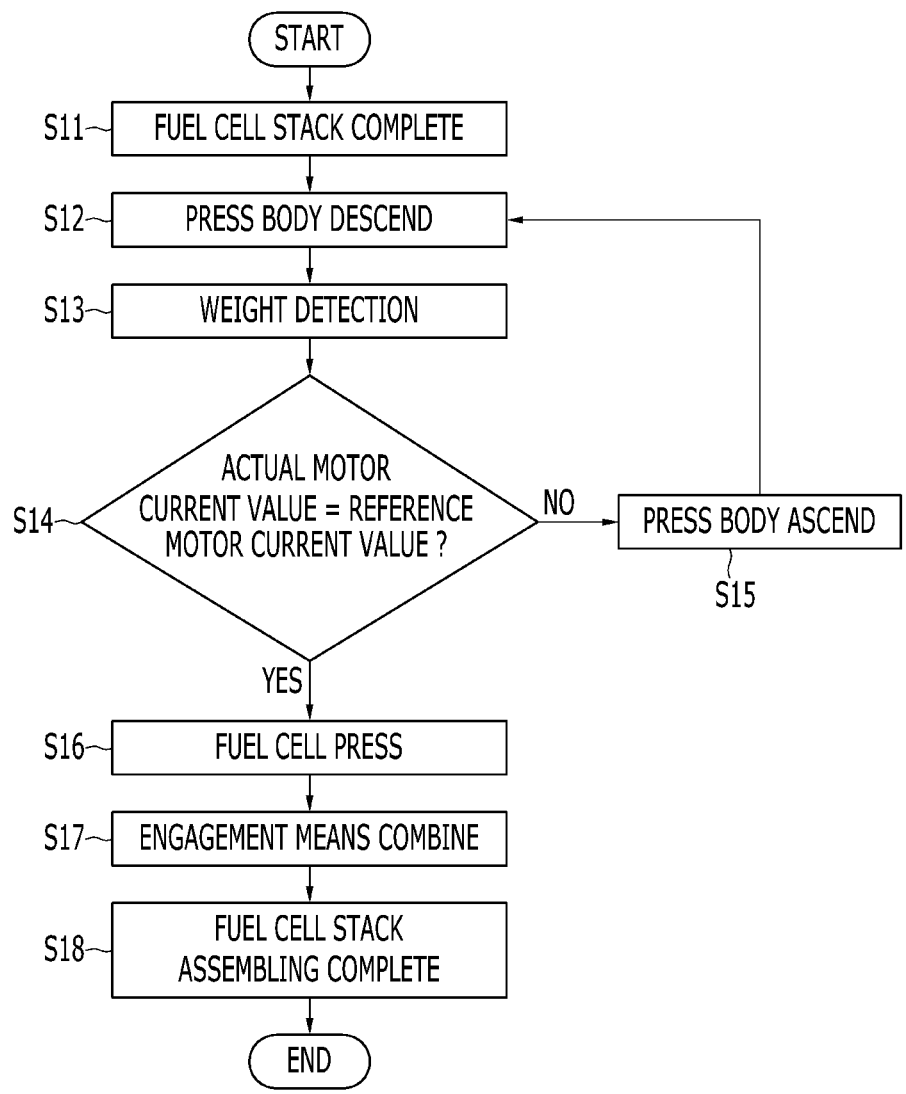
FIG. 5 is a flowchart illustrating a control method of the fuel cell stack assembly device according to an exemplary embodiment of the present invention.

FIG. 5 is a flowchart illustrating a control method of the fuel cell stack assembly device according to an exemplary embodiment of the present invention. Referring to FIG. 5 and the previously disclosed drawings, initially, in a fuel stack process according to an exemplary embodiment of the present invention, the fuel cells 1 may be stacked on the stack guide apparatus 10, and the stack guide apparatus 10 may be transferred on the lower plate 32a of the press frame 31. During this state, the fuel cells 1 are maintained arranged at the stack guide apparatus 10 by the guide bar 15 (step S11).

In particular, in an exemplary embodiment of the present invention, a descent operation signal may be applied to the press cylinder 31 by the controller 90 to descend the press body 35 by operation of the press cylinder 31 (step S12). Accordingly, in an exemplary embodiment of the present invention, the fuel cells 1 may be pressed by the press body 35 and a control signal may be applied to the motor 55 to thus operate the motor 55 which rotates the rotation plate 51 of the roller structure 50. Then, the roller 53 of the roller structure 50 may be configured to rotate while contacting the outside surface of the guide bar 15.

In an exemplary embodiment of the present invention, the current value of the motor 55 may be measured in real time by the weight detection portion 70, and abnormal motor current value that varies by weight applied to the roller 53 through the guide bar 15 and the detection signal may be output to the controller 90 (step S13). Then, the controller 90 may be configured to compare the actual motor current value detected by the weight detection portion 70 with the reference motor current value having a predetermined range to determine whether the guide bar is on the home position (step S14).

Furthermore, the controller 90 may be configured to compare the actual motor current value with the reference motor current value to determine whether the guide bar 15 is on the home position when the actual motor current value exceeds the reference motor current value. Particularly, when the guide bar 15 is not on the home position indicates that the guide bar 15 is split in the outside direction and transformed by a stack arrangement error of the fuel cells 1 when the fuel cells 1 are pressed by the press body 35.

As described above, in response to determining that the guide bar 15 is not on the home position, the controller 90 may be configured to apply an ascent operation signal to the press cylinder 33 to ascend the press body 35 using the press cylinder 33 (step S15 step). Then, the stack guide apparatus 10 in which the fuel cells 1 are stacked may be returned to the fuel cell stack process, and the fuel cells 1 may be re-stacked in the fuel cell stack process.

In an exemplary embodiment of the present invention, the controller 90 may be configured to compare the actual motor current value with the reference motor current value having a predetermined range, and when the actual motor current value is within the reference motor current value, the controller 90 may be configured to determine that the guide bar 15 is on the home position. Then, the controller 90 may be configured to continuously apply a descent operation signal to the press cylinder 33, and the fuel cells 1 may be pressed by continuously descending the press body 35 using the press cylinder 33 (step S16).

Further, in an exemplary embodiment of the present invention, when the fuel cells 1 are pressed together by the press body 35, an engagement device (not illustrated in the figures) may be connected to the stack structure (step S17), and the fuel cell stack assembling may be completed (step S18). After the fuel cell stack assembling is completed, the press body 35 may ascend by the press cylinder 33 and return to the origin position.

As described thus far, in the fuel cell stack assembly device and control method according to an exemplary embodiment of the present invention, a home position of the guide bar 15 may be determined and an arrangement error of the fuel cells 1 may be minimized by using a simplified structure. Accordingly, in an exemplary embodiment of the present invention, inaccurate assembling of the fuel cell stack that may occur due to faulty stacking of the fuel cells may be prevented, and faulty assembling of the fuel cell stack that may occur due to stack arrangement errors of the fuel cells 1 may be prevented.

Figure 6:
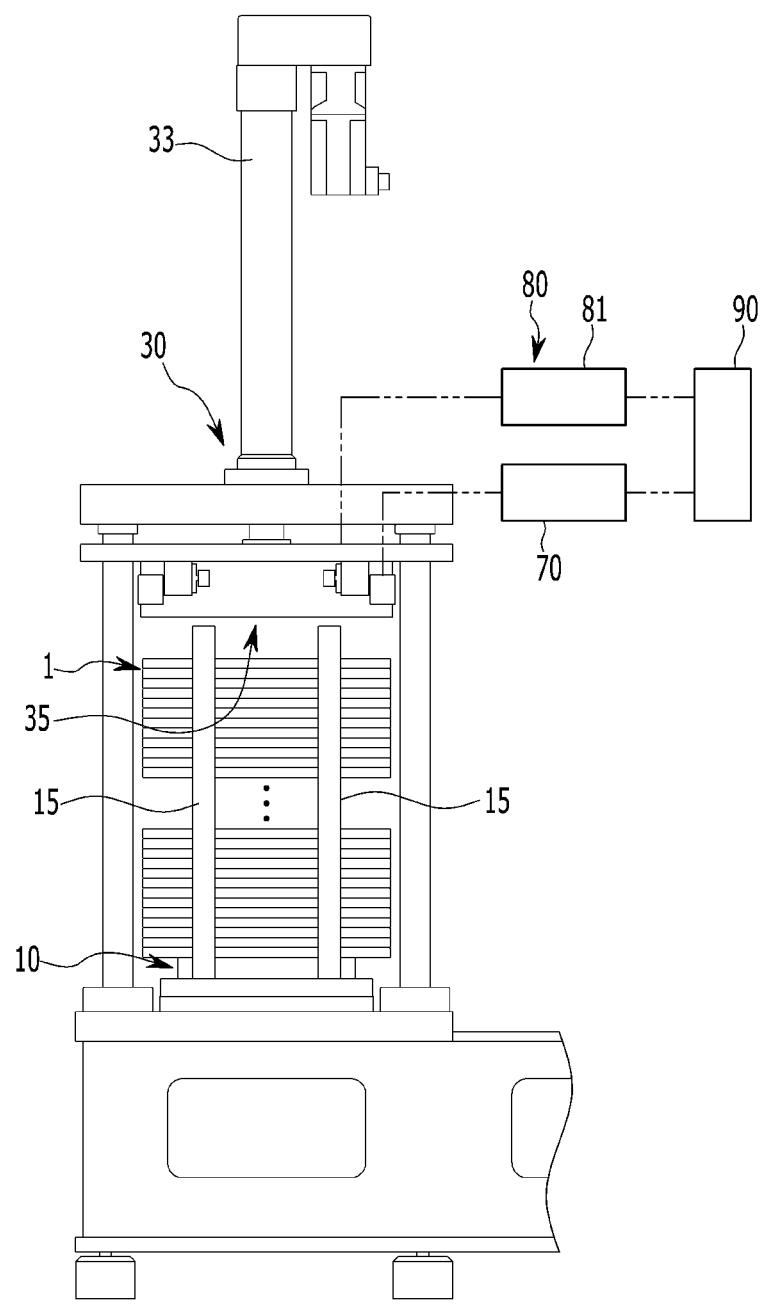
FIG. 6 is a schematic drawing illustrating a fuel cell stack assembly device according to another exemplary embodiment of the present invention.

FIG. 6 is a schematic drawing illustrating a fuel cell stack assembly device according to another exemplary embodiment of the present invention. Referring to FIG. 6, a fuel cell stack assembly device 200 according to another exemplary embodiment of the present invention may further include a position detection portion 80 configured to detect a position of the guide bar 15 of the stack guide apparatus 10, while having the basic structure of the previously described exemplary embodiment.

In an exemplary embodiment of the present invention, the position detection portion 80 may be installed at the press body 35 of the press unit 30, and for example, may be configured to detect a position (e.g., transformation amount) of the guide bar 15, and may include a displacement sensor 81 configured to output the detection signal to the controller 90. This displacement sensor 81 may include a displacement sensor conventionally known in the industry and thus a detailed description thereof will be omitted. Other constituents of the fuel cell stack assembly device 200 according to another exemplary embodiment of the present invention are the same as those of the previously described exemplary embodiment of the present invention, therefore specific description is omitted.

Hereinafter, a control method of the fuel cell stack assembly device 200 and the entire assembling process of the fuel cell stack using the method according to another exemplary embodiment of the present invention will be described specifically with reference to previously disclosed drawings and an additional drawing.

FIG. 7 is a flowchart illustrating a control method of the fuel cell stack assembly device according to another exemplary embodiment of the present invention. Referring to FIG. 6, FIG. 7, and previously disclosed drawings, in the stack process of the fuel cells 1, the descending process of the press body 35 and the detection process of the weight detection portion 70 according to another exemplary embodiment of the present invention are the same as steps S11 to S13 of the previously described exemplary embodiment of the present invention, therefore specific description is omitted.

After the step S13, in another exemplary embodiment of the present invention, the position of the guide bar 15 may be detected by the displacement sensor 81 of the position detection portion 80, and the detection signal may be output to the controller 90 (step S14). Then, in S15 step, the controller 90 may be configured to compare the actual motor current value detected by the weight detection portion 70 with the reference motor current value having a predetermined range, and when the actual motor current value exceeds the reference motor current value, an arrangement error value of the fuel cells 1 may be output as a position value of the guide bar 15 detected by the displacement sensor 81 (step S16). Particularly, the controller 90 may be configured to output the arrangement the error value of the fuel cells 1 by a formula of {sin(position value of the guide bar)°×length (mm) of the guide bar}.

Furthermore, the controller 90 may be configured to determine whether the guide bar 15 is on the home position by comparing the arrangement error value with the predetermined reference error range (step S17). In particular, the controller 90 may be configured to compare the arrangement error value with the predetermined reference error range, and when the arrangement error value exceeds the reference error range, the controller 90 may be configured to determine that the guide bar 15 is not on the home position. As described above, in response to determining that the guide bar 15 is not on the home position, the controller 90 may be configured to apply an ascent operation signal to the press cylinder 33 to ascend the press body 35 using the press cylinder 33 (step S18).

Meanwhile, in another exemplary embodiment of the present invention, the controller 90 may be configured to compare the actual motor current value with the reference motor current value having a predetermined range, and when the actual motor current value is within the reference motor current value, the controller 90 may be configured to determine that the guide bar 15 is on the home position. Further, the controller 90 may be configured to compare the arrangement error value with the predetermined reference error range, and when the arrangement error value is within the reference error range, the controller 90 may be configured to determine that the guide bar 15 is on the home position.

Additionally, a pressing process of the fuel cells 1, a combining process of the engagement device, and a complete assembling process of the fuel cell stack (steps S19 to S21) are same as those of the previously described exemplary embodiment, and the effects according to the current exemplary embodiment of the present invention are also the same as those of the previously described exemplary embodiment, therefore specific description is omitted.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A fuel cell stack assembly device, comprising:
   a stack guide apparatus arranging and stacking fuel cells using a plurality of guide bars;
   a press unit repeatedly moving vertically based on the stack guide apparatus and pressing together the fuel cells stacked on the stack guide apparatus;
   a roller structure including a roller in rolling contact with at least one of the guide bars and installed at the press unit;
   a weight detection portion detecting weight applied to the roller by at least one of the guide bars; and
   a controller determining whether at least one of the guide bars is at a home position based on a detection signal of the weight detection portion and operate the press unit.

2. The device of claim 1, wherein the press unit includes:
   a press frame;
   a press cylinder installed on the press frame; and
   a press body connected to the press cylinder.

3. The device of claim 1, wherein the at least one of the guide bards arranges the fuel cells at an inside surface of at least one of the guide bars, and the roller is rolling contact with an exterior surface of at least one of the guide bars.

4. The device of claim 1, wherein the roller structure includes:
   a rotation plate installed at a supporting bar connected to the press unit and rotatable by a motor,
   wherein the roller is idle rotatable and installed at a center of the rotation plate.

5. The device of claim 4, wherein the motor is connected to the rotation plate by a drive shaft.

6. The device of claim 4, wherein the weight detection portion measures a current value of the motor and detects an abnormal current value of the motor that varies by the weight applied to the roller.

7. A fuel cell stack assembly device, comprising:
   a stack guide apparatus arranging and stacking fuel cells using a plurality of guide bars;
   a press unit repeatedly moving vertically based on the stack guide apparatus and pressing together the fuel cells stacked on the stack guide apparatus;
   a roller structure including a roller in rolling contact with at least one of the guide bars and installed at the press unit;
   a weight detection portion detecting weight applied to the roller by at least one of the guide bars;
   a position detection portion installed at the press unit and detecting a position of at least one of the guide bars; and
   a controller outputting an arrangement error value of the fuel cells based on a detection signal of the weight detection portion and the position detection portion, determining at least one of the guide bars is at the home position by comparing the arrangement error value with a reference error range, and operating the press unit.

8. The device of claim 7, wherein the roller structure includes a rotation plate installed at a supporting bar connected to the press unit and rotatable by a motor, and the roller is idle rotatable and installed at a center of the rotation plate.

9. The device of claim 8, wherein the weight detection portion measures a current value of the motor and detects an abnormal current value of the motor that varies by the weight applied to the roller, and wherein the position detection portion is a displacement sensor.

10. A control method of the fuel cell stack assembly device according to claim 1, the stacked fuel cells being pressed by at least one of the guide bars of the stack guide apparatus and assembled, comprising:
    applying, by the controller, a descent operation signal to the press unit;
    rotating, by the controller, the roller structure by applying a control signal to the motor;
    measuring, by the controller, a current value of the motor by the weight detection portion, and detecting an abnormal current value of the motor that varies by the weight applied to the roller of the roller structure;
    determining, by the controller, whether at least one of the guide bars is at the home position by comparing an actual motor current value detected by the weight detection portion with a reference motor current value having a predetermined range; and
    applying, by the controller, an ascent operation signal to the press unit in response to determining that at least one of the guide bars is not at the home position.

11. The method of claim 10, further comprising:
    determining, by the controller, that at least one of the guide bars is at the home position when the actual motor current value is within the reference motor current value; and
    determining, by the controller, that at least one of the guide bars is not at the home position when the actual motor current value exceeds the reference motor current value.

12. The method of claim 11, wherein in response to determining that at least one of the guide bars is at the home position, a descent operation signal is continuously applied to the press unit.

13. A control method of the fuel cell stack assembly device according to claim 7, the stacked fuel cells being pressed by at least one of the guide bars of the stack guide apparatus and assembled, comprising:
    applying, by the controller, a descent operation signal to the press unit;
    rotating, by the controller, the roller structure by applying a control signal to the motor;
    measuring, by the controller, a current value of the motor by the weight detection portion, and detecting an abnormal current value of the motor that varies by the weight applied to the roller;
    detecting, by the controller, a position of at least one of the guide bars by the position detection portion;

comparing, by the controller, an actual motor current value detected by the weight detection portion with a reference motor current value having a predetermined range to output an arrangement error value of the fuel cells by a position value of at least one of the guide bars detected by the position detection portion when the actual motor current value exceeds the reference motor current value;

comparing, by the controller, the arrangement error value and the predetermined reference error range to determine whether at least one of the guide bars is at the home position; and applying, by the controller, an ascent operation signal to the press unit in response to determining that at least one of the guide bars is not at the home position.

14. The method of claim 13, wherein the arrangement error value (mm) is output by a formula of {sin(position value of at least one of the guide bars)°×length (mm) of at least one of the guide bars}.

15. The method of claim 13, further comprising:

determining, by the controller, that at least one of the guide bars is at the home position when the arrangement error value is within the reference error range; and determining, by the controller, that at least one of the guide bars is not at the home position when the arrangement error value exceeds the reference error range.

16. The method of claim 13, wherein in response to determining that at least one of the guide bars is at the home position, a descent operation signal is continuously applied to the press unit.

* * * * *